(12) United States Patent
Miyata (10) Patent No.: US 7,568,731 B2
(45) Date of Patent: *Aug. 4, 2009

(54) AIRBAG DEVICE AND MOTORCYCLE WITH THE AIRBAG DEVICE

(75) Inventor: Yasuhito Miyata, Echi-gun Shiga (JP)

(73) Assignee: Takata Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/776,589

(22) Filed: Jul. 12, 2007

(65) Prior Publication Data

US 2007/0284857 A1 Dec. 13, 2007

Related U.S. Application Data

(63) Continuation of application No. 10/781,237, filed on Feb. 18, 2004, now Pat. No. 7,275,762.

(30) Foreign Application Priority Data

Apr. 16, 2003 (JP) ............................. 2003-112189

(51) Int. Cl.
*B60R 21/016* (2006.01)
(52) U.S. Cl. ............. 280/743.2; 280/743.1; 280/730.1; 280/728.2
(58) Field of Classification Search .............. 280/730.1, 280/743.2, 743.1, 733, 728.2
See application file for complete search history.

(56) References Cited

U.S. PATENT DOCUMENTS

| | | | | | |
|---|---|---|---|---|---|
| 5,636,861 | A | * | 6/1997 | Orsulak et al. | 280/730.1 |
| 5,967,545 | A | * | 10/1999 | Iijima et al. | 280/730.1 |
| 6,007,090 | A | * | 12/1999 | Hosono et al. | 280/730.2 |
| 6,250,677 | B1 | * | 6/2001 | Fujimura | 280/743.2 |
| 6,932,379 | B2 | * | 8/2005 | Yamazaki et al. | 280/730.1 |
| 6,932,385 | B2 | * | 8/2005 | Hawthorn et al. | 280/739 |
| 7,111,871 | B2 | * | 9/2006 | Thomas | 280/743.2 |
| 2003/0057691 | A1 | * | 3/2003 | Tokita et al. | 280/743.2 |

* cited by examiner

*Primary Examiner*—John Q. Nguyen
*Assistant Examiner*—Timothy Wilhelm
(74) *Attorney, Agent, or Firm*—Fitch, Even, Tabin & Flannery (57) ABSTRACT

An airbag is provided that is constructed to protect a rider of a vehicle in an accident. In one form, an airbag device mounted to a motor-bicycle, which is a motorcycle, and comprising an airbag and a long webbing for securing the airbag to the vehicle body. When the motor-bicycle collides at a location that is situated in front of the motor-bicycle, the airbag is deployed and inflated while protruding towards a rider protection area that is situated in front of a rider. One end of the webbing is inserted into the airbag through a vent hole passing through a wall surface of the airbag in order to, when the deployment and inflation of the airbag are completed, restrict movement of the airbag in a forward direction of the vehicle body, and to, during the deployment and inflation of the airbag, allow movement of the airbag in a protruding direction.

3 Claims, 12 Drawing Sheets

Vehicle Front

AIRBAG DEVICE AND MOTORCYCLE WITH THE AIRBAG DEVICE

CROSS-REFERENCE TO RELATED APPLICATIONS

This is a Continuation of prior U.S. patent application Ser. No. 10/781,237, filed Feb. 18, 2004, which claims priority to Japanese Patent Application No. JP 2003-112189, filed Apr. 16, 2003. All of these prior applications are hereby incorporated by reference in their entirety.

FIELD OF THE INVENTION

The present invention relates to a technology of constructing an airbag device mounted to a motorcycle.

BACKGROUND OF THE INVENTION

Hitherto, various technologies of protecting a rider by an airbag device mounted to a motorcycle have been known. For example, a technology used in a motor-bicycle for holding an airbag by a securing member which is used to connect an airbag device and a vehicle body (vehicle frame) and which stretches along with the air bag when the airbag is deployed is publicly known (refer to, for example, Japanese Unexamined Patent Application Publication No. 10-35564). According to the technology, even if the vehicle body has an open structure in all directions like a motorcycle, a rider can be restrained by the airbag.

SUMMARY OF THE INVENTION

Accordingly, the inventor et al. have devoted themselves to studying effective technologies of thoroughly protecting a rider in an accident by an airbag device whose airbag is connected to a vehicle frame by a securing member. Based on the results of the studies, the inventor et al. found out that, by improving, for example, the structure of the securing member and the disposition of the securing member with respect to the airbag, the airbag can be smoothly deployed and inflated, thereby making it possible to thoroughly protect the rider in an accident.

Considering this point, it is an object of the present invention to provide a technology of constructing an airbag which thoroughly protects a rider on a motorcycle in an accident, and technologies related thereto.

To this end, the inventions disclosed in the claims are provided, and may be applied to a structure of an airbag device mounted to various motorcycles. In the specification, the term "motorcycle" is used to widely include vehicles in which a rider sits astride a seat. Therefore, for example, a motor-bicycle of a type having a fuel tank disposed in front of a rider's seat and a motor-bicycle of a scooter-type having a space between a rider's seat and a handlebar supporting head tube are defined as motorcycles. In addition, the term "motorcycle" is used to widely include, in addition to motor-bicycles, vehicles having three or more wheels and having a seat that a rider sits astride (such as a three-wheeled motorcycle used to, for example, deliver pizzas to homes, and a three-wheeled or a four-wheeled buggy motorcycle for traveling bad roads entirely), and vehicles, such as snowmobiles, which move using a sled or a crawler and which have a seat that a rider sits astride.

In a first form of the invention, an airbag device mounted to a motorcycle comprises an airbag and at least one long securing member.

When the motorcycle collides at a location that is situated in front of the motorcycle, inflation gas is supplied into the airbag used in the present invention. In a typical structure of the airbag device, the airbag and means for inflating the airbag, such as an inflator, are accommodated in a retainer, serving as an accommodating member, and the inflation gas is supplied into the airbag by operating the inflator. By this, the airbag is deployed and inflated while protruding towards a rider protection area disposed in front of the rider.

The securing member used in the present invention is long and has a structure for securing the airbag to the body of the motorcycle. As the securing member, anything that is long and strong enough to hold the airbag at the motorcycle body may be used. Here, the term "long" is a term that is mainly used to widely include the form of a strip or string, so that, typically, a webbing formed of, for example, resin fibers that are formed into the shape of a belt is desirably used.

In the present invention, the securing member restricts the forward movement of the airbag by holding the airbag at the vehicle body by the tension of the securing member when the deployment and inflation of the airbag are completed. During the deployment and inflation of the airbag, the securing member allows the airbag to move in the protruding direction.

In a typical example, one end of the long securing member is mounted to the airbag, and the other end of the securing member is mounted to a portion of the vehicle body at the rear of the rider protection area. During the deployment and inflation of the airbag, the securing member allows the airbag to move in the protruding direction, and the length and disposition of the securing member are such that movement of the airbag in the protruding direction is restricted when the deployment and inflation of the airbag are completed.

The present inventor et al. have devoted themselves to studying, for example, the effects between the airbag and the securing member. Based on the results of the studies, the inventor et al. found out that, during deployment and inflation of the airbag (that is, up to the time the deployment and inflation of the airbag are completed), the airbag is smoothly deployed and inflated by virtue of a structure in which a pulling force of the securing member is restricted, so that this is very effective in protecting a rider. Therefore, the present invention makes use of a structure which minimizes interference of the securing member with the protrusion of the airbag towards the rider protection area. In the present invention, the term "allow" is primarily used to mean that a structure is a satisfactory structure as long as the securing member allows the airbag to move in the protruding direction. Accordingly, the term "allow" does not refer to the extent to which the airbag is allowed to move in the protruding direction.

When the deployment and inflation of the airbag are completed, the tension of the securing member acts upon the airbag and the vehicle body, thereby making it difficult for the airbag to move away in a forward direction, so that a resistance that is sufficient to restrain the rider by the airbag can act upon the airbag.

In particular, in the present invention, an end of the securing member is inserted into the airbag through a through hole that passes through a wall surface of the airbag, and is mounted to the airbag. The through hole may be, like a vent hole for discharging inflation gas, a hole that is already formed in the airbag, or may be a hole that is separately formed for passing the securing member. The end of the securing member may be mounted to an inner wall surface of the airbag by inserting the end into the airbag, or may be mounted to an outer wall surface of the airbag by inserting the end into the airbag, then passing it through a wall surface of the airbag, and then bringing it out of the airbag. By virtue of such a structure, it is possible for the securing member to be formed shorter compared to the case in which, for example, the securing member is disposed along the outer wall surface of the airbag, so that this structure is an improved structure.

When the first form of the invention is used as described above, the airbag device which can thoroughly protect a rider in an accident can be produced with an improved structure.

In a second form, it is desirable for the at least one long securing member to be disposed at a central area of the vehicle body between both legs of the rider. In the present invention, the term "central area of the vehicle body" is used to widely include an area passing through substantially the center of the rider in plan view of the vehicle body. Typically, the area corresponds to an area passing between both legs of the rider seated astride a seat at the vehicle body. In the present invention, the securing member is formed so that the rider does not easily get caught by or come into contact with the securing member. By virtue of such a structure, it is possible to, during the deployment and inflation of the airbag, minimize interference with a smooth operation of the airbag when the securing member gets caught by the rider during the deployment and inflation of the airbag.

In a third form, the at least one long securing member comprises one long securing member. In the present invention, the term "one" is used to widely include a practical form in which one member has a closed annular shape, and a practical form in which one member is formed by connecting a plurality of parts. For example, in the case where one member has a closed annular shape, even if this one member appears to have two parts, the number of members is one in the present invention.

Such a structure of the present invention makes it possible to simplify the structure of the securing member. In particular, by disposing one long member used as the securing member in a straight line, the size of an area in which the securing member is disposed can be reduced, so that it is possible to produce a structure in which the securing member does not easily interfere with the rider during the deployment and inflation of the airbag.

In a fourth form, the airbag may have a vent hole as a through hole for passing the at least one securing member. The vent hole is ordinarily used for discharging out of the airbag a portion of the inflation gas supplied into the airbag during protrusion of the airbag (that is, during the deployment and inflation of the airbag). This structure is an improved structure because the existing vent hole is used as a through hole for passing the securing member.

A fifth form of the invention relates to a motorcycle with the airbag device. In the motorcycle, one end of the securing member is mounted to the airbag by inserting the one end into the airbag through the through hole passing through the wall surface of the airbag, and the other end of the securing member is mounted to a portion of the motorcycle body at the rear of the rider protection area. Accordingly, a motorcycle with an airbag device which can thoroughly protect the rider in an accident is formed with an improved structure.

DETAILED DESCRIPTION OF THE PREFERRED EMBODIMENTS

Figure 1:
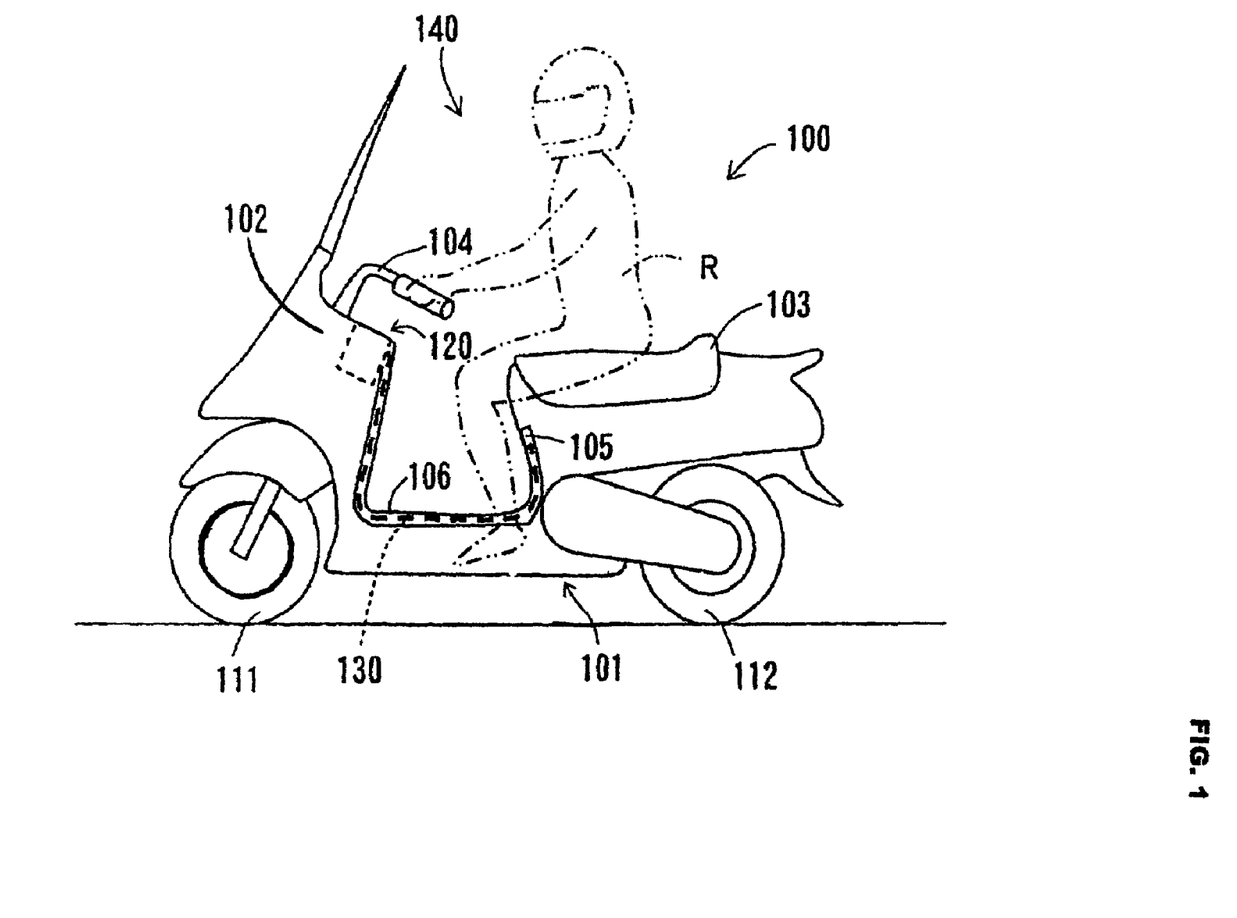
FIG. 1 is a side view of a motor-bicycle (scooter) 100 of a first embodiment of the present invention having an airbag device 120 mounted thereto.
Figure 2:
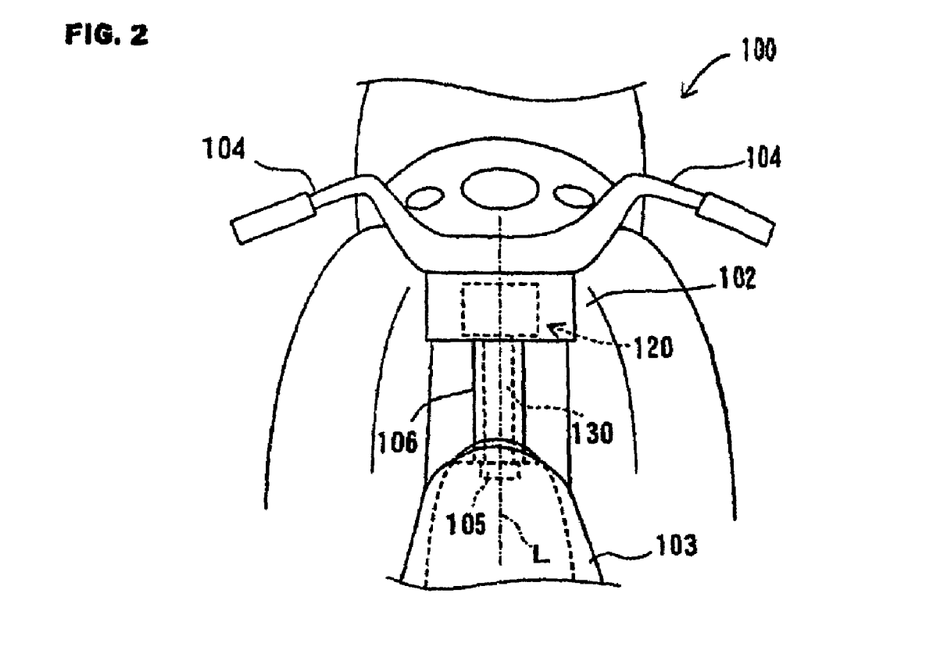
FIG. 2 illustrates a front portion 102 shown in FIG. 1 as seen from a rider R.
Figure 3:
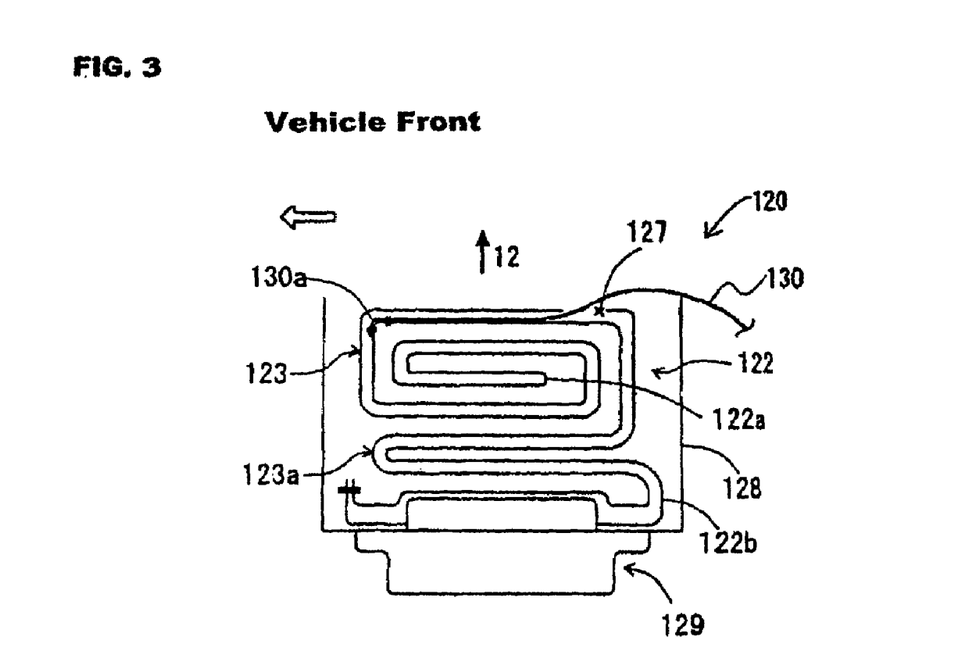
FIG. 3 illustrates the structure of the airbag device 120 shown in FIG. 1.
Figure 4:
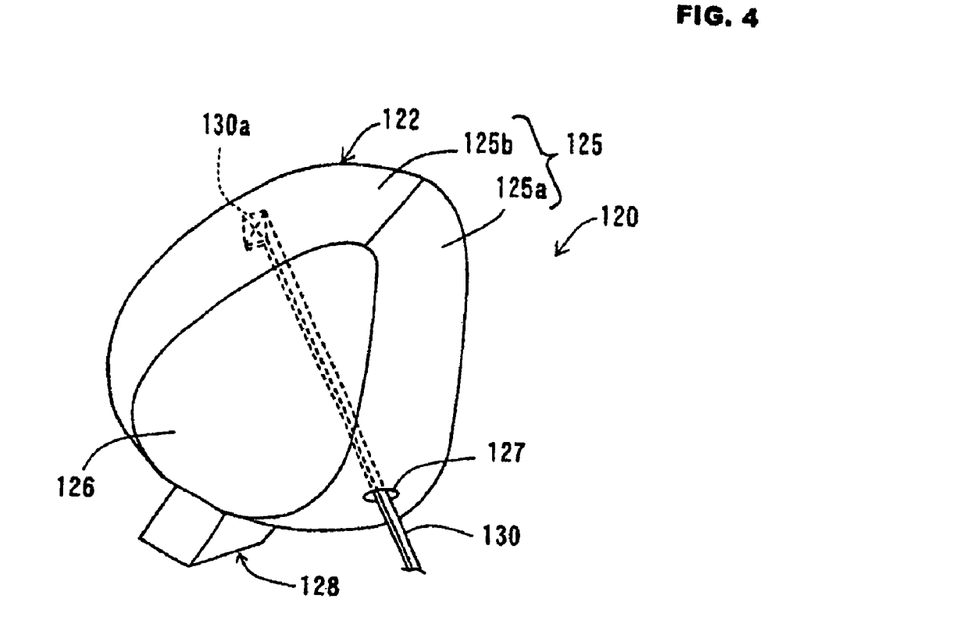
FIG. 4 is a perspective view of an airbag 122 shown in FIG. 3 in a completely deployed and inflated state.
Figure 5:
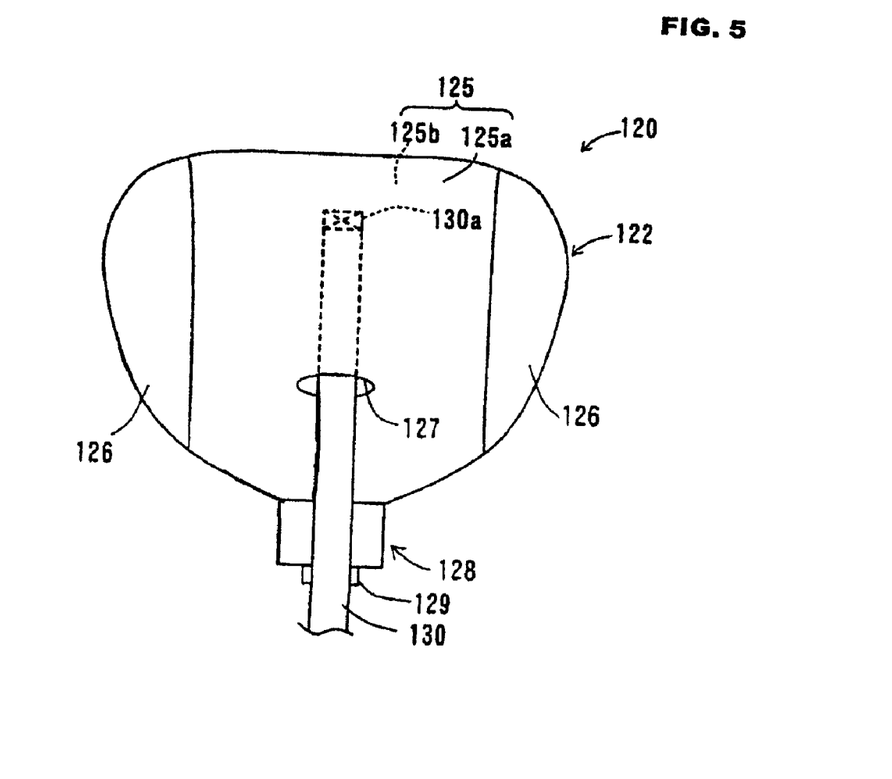
FIG. 5 illustrates the airbag 122 shown in FIG. 4 as seen from the rider R.

Hereunder, a detailed description of preferred embodiments of the present invention will be given with reference to the drawings. First, a first embodiment of the present invention will be described. FIG. 1 is a side view of a motor-bicycle (scooter) 100 of the first embodiment of the present invention having an airbag device 120 mounted thereto. FIG. 2 illustrates a front portion 102 shown in FIG. 1 as seen from a rider R. FIG. 3 illustrates the structure of the airbag device 120 shown in FIG. 1. FIG. 4 is a perspective view of an airbag 122 shown in FIG. 3 in a completely deployed and inflated state. FIG. 5 illustrates the airbag 122 shown in FIG. 4 as seen from the rider R. The motor-bicycle 100 of the embodiment is one example of a motorcycle in the present invention.

As shown in FIG. 1, the motor-bicycle 100 is a scooter almost exclusively comprising a vehicle-body structural portion 101, a seat 103, handlebars 104, a front wheel 111, and a rear wheel 112. The vehicle-body structural portion 101 comprises, for example, an engine and a mainframe. The rider R can sit astride the seat 103.

An area disposed above the vehicle-body structural portion 101 of the motor-bicycle 100 and in front of the rider R is defined as a rider protection area 140 that is used to protect the rider R when the motor-bicycle 100 collides at a location that is situated in front of the motorcycle. In the embodiment, the phrase "the motor-bicycle 100 collides at a location that is situated in front of the motorcycle" is used widely to include any collision of the motor-bicycle 100 with an object (not shown for the sake of simplicity) disposed in front of the motor-bicycle 100. In addition, in the embodiment, the term "rider protection area 140" is defined as a space which extends in a forward movement direction 10 of the rider R and which is used to restrain and protect the rider R that is in a state of being capable of being thrown off in the forward direction of the motor-bicycle 100 when the kinetic energy that is generated when the motor-bicycle 100 collides at a location that is situated in front of the motorcycle is acting to move the rider R in the forward direction.

The airbag device 120, kinds of meters, kinds of switches, etc. are disposed at the front portion 102 of the vehicle body among the portions of the vehicle-body structural portion 101. In particular, the airbag device 120 is disposed so as to face the rider protection area 140. More specifically, in the embodiment, the airbag device 120 is disposed so that a protruding (deployment and inflation) direction of the airbag 122 (described later) is in the upper forward direction of the rider R. A belt-shaped webbing 130 for securing the airbag 122 to the vehicle body is disposed between the airbag device 120 and a fastener 105 disposed below the seat 103. More specifically, one end of the webbing 130 is mounted to the airbag device 120, and the other end of the webbing 130 is mounted to the fastener 105 at the vehicle body 101. The webbing 130 corresponds to the "long securing member" in the present invention. The fastener 105 is disposed at the rear of the rider protection area 140, and corresponds to "at a portion of the vehicle body at the rear of the rider protection area."

As the webbing 130, a webbing (resin fiber threads formed into the shape of a belt) used to form, for example, a seatbelt of a vehicle is used. One webbing 130 is disposed between the airbag device 120 and the fastener 105. When the airbag device 120 is not operating, the webbing 130 is covered by a webbing cover 106 disposed at the vehicle-body structural portion 101. The webbing 130 may be formed of the same material as a seatbelt of a vehicle or an airbag cloth.

As shown in FIG. 2, the webbing 130 is disposed along a central line L between the airbag device 120 and the fastener 105. The central line L is a line extending in the forward and backward directions from the center of the vehicle body. When the rider R sits astride the seat 103, the central line L passes between the left and right legs of the rider R. By this, the webbing 130 is disposed so that it passes substantially the center of the rider in plan view. The mode of disposing the webbing 130 corresponds to the mode of disposing the securing member along the central area of the vehicle body, the central area extending between both legs of the rider. In the case where the webbing 130 is disposed in this manner, even if the webbing cover 106 is removed, not to mention the case in which the webbing 130 is covered by the webbing cover 106, it is possible to minimize interference of the webbing 130 with the rider R.

As shown in FIG. 3, the airbag device 120 almost exclusively comprises a retainer 128, the airbag 122, and an inflator 129. The retainer 128 is an accommodating member. The airbag 122 is accommodated in a folded state in the retainer 128. The inflator 129 supplies inflation gas for deploying and inflating the airbag 122 from the retainer 128. In FIG. 3, the protruding (deployment) direction of the airbag 122 is represented by an arrow 12.

The airbag 122 accommodated in the retainer 128 has an accordion-fold portion 123a and a roll-like folded portion 123 folded in the shape of a roll around a folding center 122a in a clockwise direction in FIG. 3. An open end 122b of the airbag 122 is mounted to a gas supplying portion of the inflator 129.

As shown in FIG. 4, the airbag 122 comprises a main panel 125 and a pair of left and right side panels 126. The side panels 126 are disposed, one at each side of the main panel 125. The main panel 125 comprises a rider-side panel structural cloth 125a and a front panel structural cloth 125b. The rider-side panel structural cloth 125a is disposed towards the rider R when the deployment and inflation are completed. The front panel structural cloth 125b is disposed towards the front side of the vehicle body when the deployment and inflation are completed. The airbag 122 is formed by, for example, sewing and mounting the side panels 126 to the respective sides of the main panel 125.

As shown in FIGS. 3 to 5, a vent hole 127 is formed in the rider-side panel structural cloth 125a of the airbag 122, (wall surface of the airbag 122). Since, during the protrusion (deployment and inflation) of the airbag 122, the vent hole 127 discharges out of the airbag 122 a portion of the gas that is generated from the inflator 129, the airbag 122 that is maximally inflated in front of the rider R can gently catch the rider. In the embodiment, one end 130a of the webbing 130 is inserted into the airbag 122 through the vent hole 127, and is mounted to a predetermined location of an inner wall surface of the airbag 122 by, for example, sewing or using an adhesive. By this, the airbag 122 is connected to the fastener 105 at the vehicle-body structural portion 101 through the webbing 130.

In this way, in the embodiment, the vent hole 127 for discharging inflation gas is used as a through hole for inserting the one end 130a of the webbing 130 into the airbag 122. In other words, the vent hole 127 corresponds to the through hole in the present invention. Such a mode of disposing the webbing 130 is an improved mode because it becomes possible to reduce the length of the webbing compared to, for example, the case in which the webbing is disposed along the outer wall surface of the airbag 122.

Figure 6:
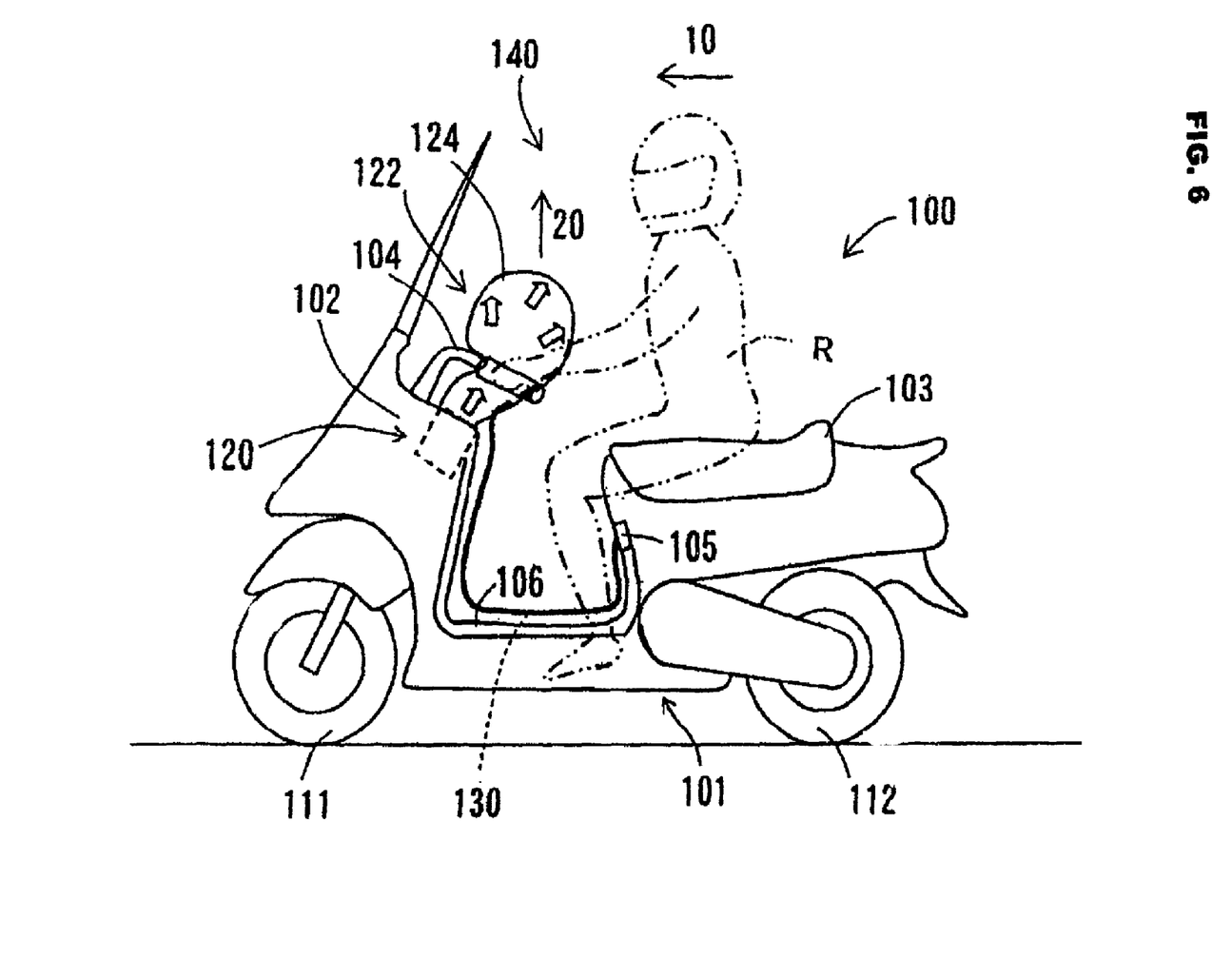
FIG. 6 is a side view of the motor-bicycle 100, with the airbag 122 being deployed and inflated.
Figure 7:
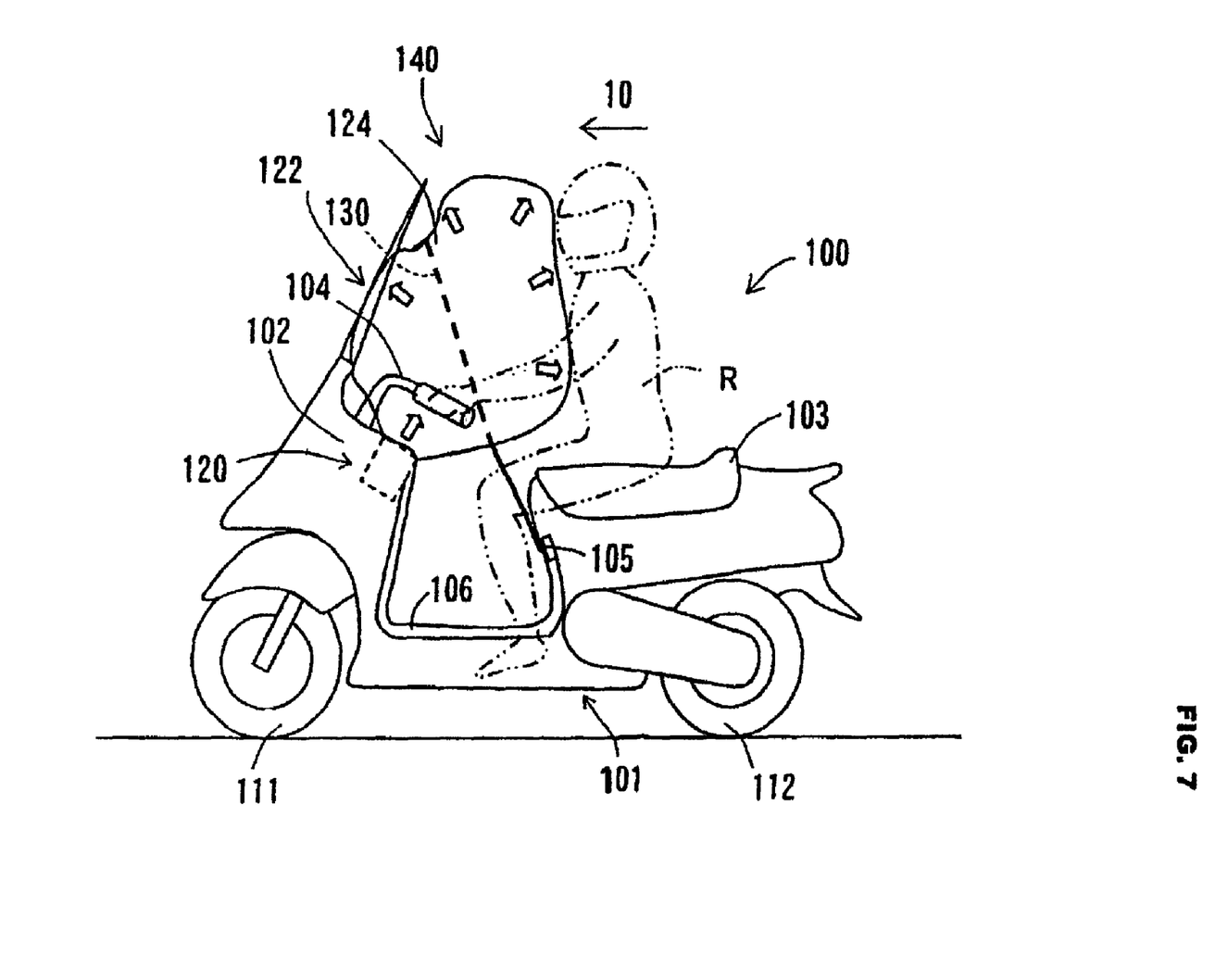
FIG. 7 is a side view of the motor-bicycle 100, with the deployment and inflation of the airbag 122 being completed.

Next, the operation of the airbag device 120 and the motor-bicycle 100 of the first embodiment with the above-described structures will be described with reference to, for example, FIGS. 6 and 7 in addition to FIGS. 1 to 5. Here, FIG. 6 is a side view of the motor-bicycle 100, with the airbag 122 being deployed and inflated. FIG. 7 is a side view of the motor-bicycle 100, with the deployment and inflation of the airbag 122 being completed.

When the motor-bicycle 100 that the rider R is riding in the state shown in FIG. 1 collides in a direction of travel, the rider R is in a state of being capable of being moved towards the front of the motor-bicycle 100, for example, in the direction of arrow 10 in FIG. 1 (is in a state of being capable of being thrown off). In the embodiment, by detecting collision of the motor-bicycle 100 at a location that is situated in front of the motor-bicycle 100, the protrusion (deployment) of the airbag 122 from the airbag device 120 towards the rider protection area 140 is started. This state is shown in FIG. 6.

As shown in FIG. 6, here, first, the accordion-fold portion 123a (shown in FIG. 3) of the airbag device 122 starts to protrude, and the roll-like folded portion 123 (shown in FIG. 3) is deployed in the direction of arrow 20 shown in FIG. 6 while being rolled out towards the rider protection area 140 as described above. When the deployment of the airbag 122 is started, inflation gas is sent into the airbag 122 through the inflator 129 in the retainer 128, so that an inflated portion 124 is gradually formed in the airbag 122 from the retainer 128. The mode of inflating the airbag 122 while deploying it corresponds to the deployment and inflation in the present invention.

In the embodiment, the webbing 130 is formed so that, during the deployment and inflation of the airbag 122, the webbing 130 allows (does not restrict) the movement of the airbag 122 in the protruding direction (that is, in the direction of arrow 20 in FIG. 6). In other words, the webbing 130 in the embodiment is sufficiently long and set at a position so as to minimize its interference with the operation of the airbag 122 when the airbag 122 moves in the protruding direction. For example, the webbing 130 has a length that is sufficiently longer than a straight-line distance between the airbag device 120 and the fastener 105. By virtue of such a structure, the airbag 122 can operate smoothly during the deployment and inflation of the airbag 122. Moreover, in the embodiment, since the webbing 130 (corresponding to the "one long member" in the present invention) is disposed between the left and right legs of the rider R, even if the webbing cover 106 covering the webbing 130 is removed during the deployment and inflation of the airbag 122, the webbing 130 is prevented from being caught by, for example, the rider R or parts disposed at the vehicle-body structural portion 101, thereby making it possible for the airbag 122 to be smoothly deployed and inflated.

As the airbag 122 is deployed and inflated, the inflated portion 124 is gradually enlarged while the roll-like folded portion 123 (shown in FIG. 3) of the airbag 122 is reduced in size. At this time, when the airbag 122 is deployed, first, the accordion-fold portion 123a (shown in FIG. 3) is protruded, and the roll-like folded portion 123 is rolled out at a location that is far enough from the vehicle-body structural portion 101 in the direction in which the roll-like folded portion 123 extends away from the rider R. Therefore, the airbag device 100 is constructed to ensure smooth deployment of the airbag 121 towards the rider protection area 140, so that its deployment is not hindered.

Then, the deployment and inflation of the airbag 122 are completed, so that the inflated portion 124 is formed in the rider protection area 140 as shown in FIG. 7. When the airbag 122 is completely deployed and inflated, the inflated portion 124 of the airbag 122 fills the rider protection area 140 in order to, at the rider protection area 140, reliably hold and restrain the rider R that is in a state of being moved in the direction of arrow 10 by kinetic energy that is produced in a collision, thereby preventing beforehand the rider R from being thrown off in the forward direction of the motor-bicycle 100. As shown in FIG. 7, since the webbing 130 is stretched in a straight line between the airbag 122 and the fastener 105, the tension of the webbing 130 acts to restrict the movement of the airbag 122 in the forward direction of the vehicle body. Therefore, the airbag 122 does not easily move in the forward direction of the vehicle body, so that a sufficient resistance for restraining the rider R is generated.

Figure 8:
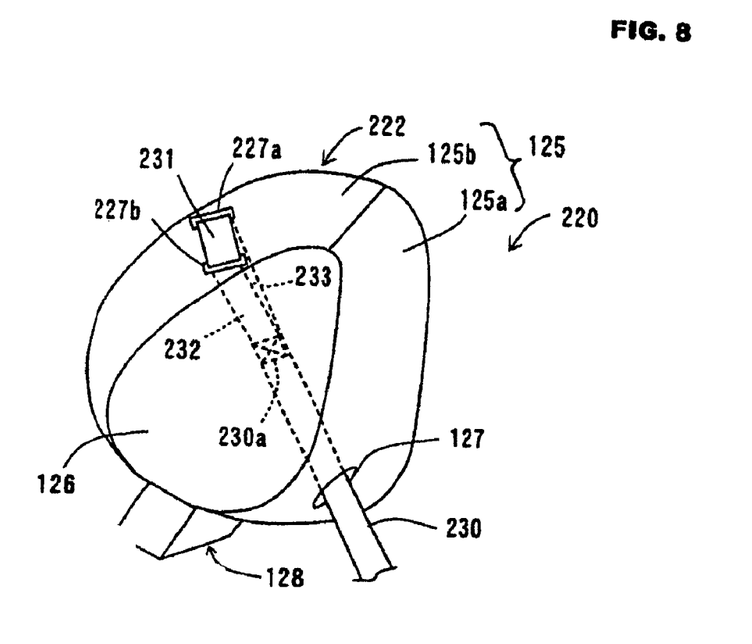
FIG. 8 is a perspective view of an airbag 222 in a second embodiment in a completely deployed and inflated state.
Figure 9:
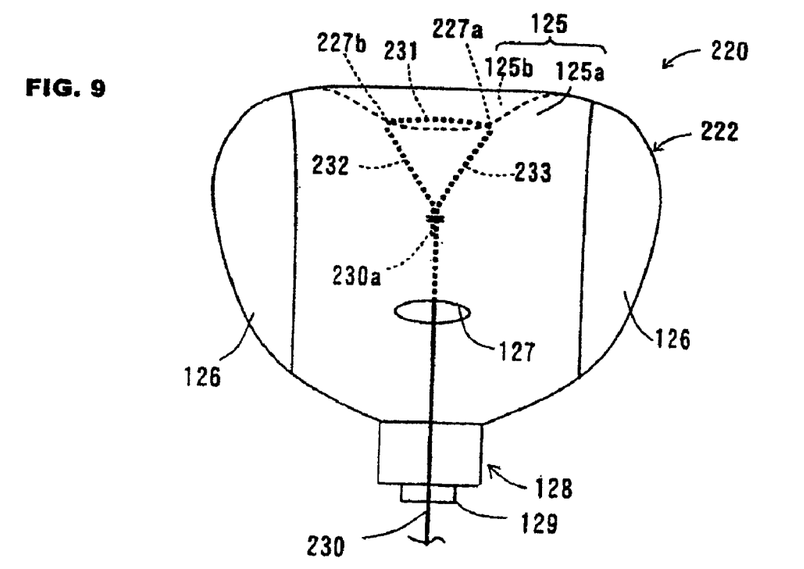
FIG. 9 illustrates the airbag 222 shown in FIG. 8 as seen from the rider R.
Figure 10:
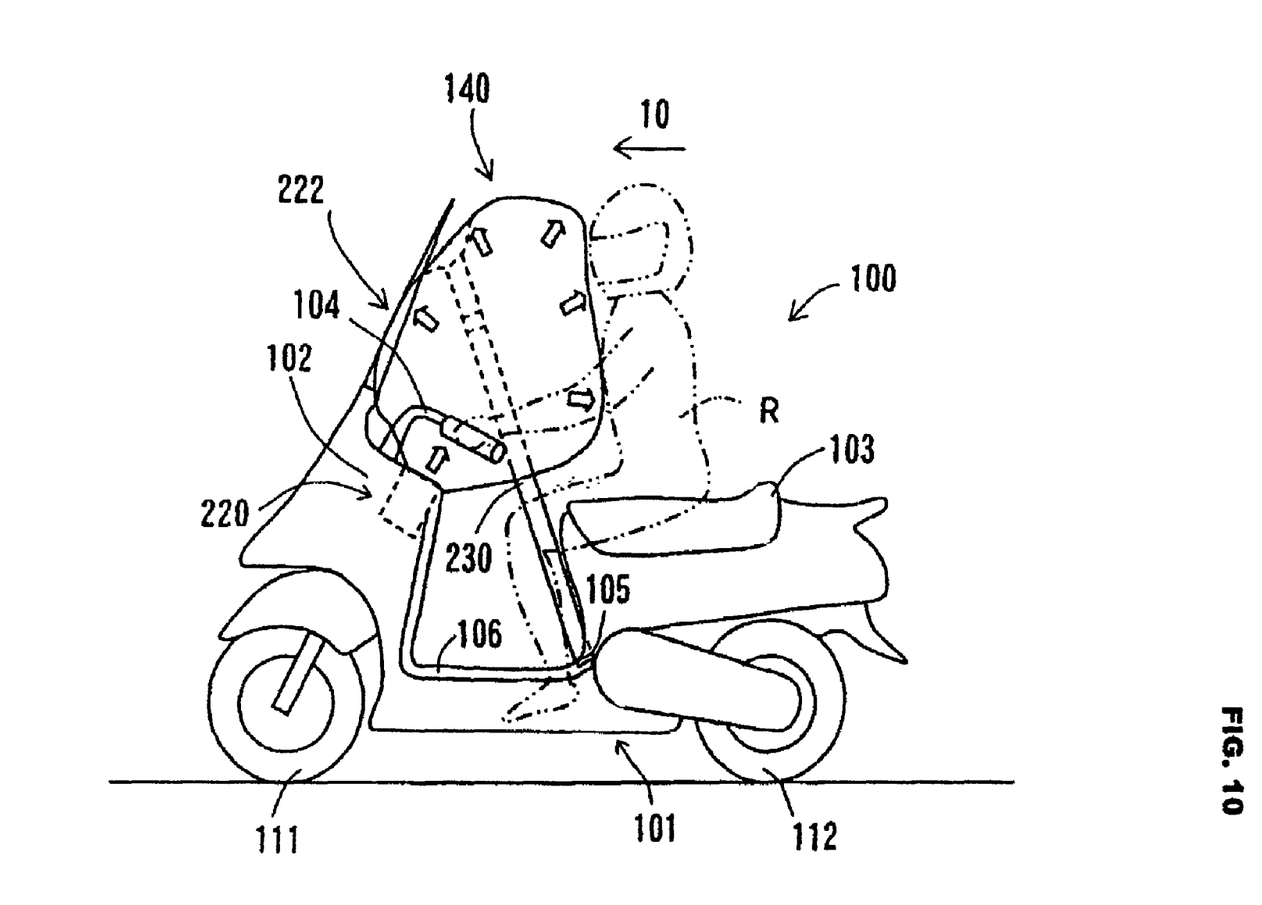
FIG. 10 is a side view of the motor-bicycle 100, with the deployment and inflation of the airbag 222 being completed.

Next, a second embodiment of the present invention will be described with reference to FIGS. 8 to 10. FIG. 8 is a perspective view of an airbag 222 in the second embodiment in a completely deployed and inflated state. FIG. 9 illustrates the airbag 222 shown in FIG. 8 as seen from the rider R. FIG. 10 is a side view of the motor-bicycle 100, with the deployment and inflation of the airbag 222 being completed. The second embodiment differs from the first embodiment in the mode of mounting a webbing to the airbag 222. Parts having substantially the same structures as parts in the first embodiment are given the same reference numerals, and will not be described below as a matter of convenience.

An airbag device 220 of the second embodiment comprises the airbag 222 taking the form shown in FIGS. 8 and 9 in a completely deployed and inflated state.

A webbing 230 is inserted into the airbag 222 through a vent hole 127 in the airbag 222. One end 230a of the webbing 230 is mounted to the airbag 222 by a mounting method described later. The webbing 230 is formed of, for example, the same material as the material of the webbing 130 in the first embodiment. In the second embodiment, two through holes 227a and 227b are formed in the airbag 222 in correspondence with the shape of the webbing 230.

When the webbing 230 is to be mounted to the airbag 222, the one end 230a of the webbing 230 that has been inserted into the airbag 222 through the vent hole 127 is passed through the through hole 227a from the inside of the airbag 222, and, then, through the through hole 227b. Lastly, the one end 230a is secured to the webbing 230 itself in the airbag 222 by sewing or by using an adhesive. By this, the airbag 222 is connected to the vehicle-body structural portion 101 through the webbing 230. Such a structure makes it possible to increase the strength with which the webbing 230 is mounted to the airbag 222. In order to secure the one end 230a of the webbing 230 to the webbing 230 itself, securing means, such as kinds of rivets or bolts, may be used.

When the webbing 230 is disposed in this manner, it is possible for the webbing 230 to be formed shorter compared to the case in which, for example, the webbing is disposed along the outer wall surface of the airbag 222, so that this structure is an improved structure.

As shown in FIG. 9, the webbing 230 has a substantially triangular portion formed at a portion where the webbing 230 is mounted to the airbag 222 by a first portion 231, a second portion 232, and a third portion 233. The first portion 231 is exposed to the outside of the airbag 222. The second portion 232 and the third portion 233 are disposed in the airbag 222. The first portion 231 extends towards the left and right with respect to the airbag 222, and restricts the movement of the airbag 222 in the forward direction of the vehicle body by coming into contact with the outer peripheral surface of the airbag 222. According to such a structure, when the inflation of the airbag 222 is completed, it is possible to stably hold the airbag 222 by preventing the airbag 222 from swinging towards the left and right.

Like the webbing 130 in the first embodiment, the webbing 230 in the second embodiment has a length and is disposed at a location, which, during the deployment and inflation of the airbag 222, allow (do not restrict) the movement of the airbag 222 in the protruding direction (that is, in the direction of arrow 20 in FIG. 6). In addition, as in the first embodiment, one webbing 230 is disposed between the left and right legs of the rider R sitting astride the seat 103, at a location between the airbag device 220 and the fastener 105, and is covered by the webbing cover 106. (For example, see FIG. 2.)

Here, the operation of the airbag device 220 of the second embodiment will be described with reference to FIG. 10, etc.

When the motor-bicycle 100 that the rider R is riding collides in the direction of travel in an accident, as in the first embodiment, this collision of the motor-bicycle 100 at a location that is situated in front of the motor-bicycle 100 is detected in order to start the protrusion (deployment) of the airbag 222 from the airbag device 220 (see FIG. 10) towards the rider protection area 140. Subsequent to this, the airbag 222 continues to be deployed and inflated. At this time, since the webbing 230 is formed with a sufficient length and is disposed at a location to minimize interference of the webbing 230 with the operation of the airbag 222, the webbing 230 allows (does not restrict) the movement of the airbag 222 in the protruding direction (that is, in the direction of arrow 20 in FIG. 6) during the deployment and inflation of the airbag 222. Such a structure makes it possible to smoothly operate the airbag 222 that is being deployed and inflated.

As shown in FIG. 10, when the airbag 222 is in a completely deployed and inflated state, the webbing 230 is stretched in a straight line between the airbag 222 and the fastener 105. By the tension of the webbing 230, the movement of the airbag 222 in the forward direction of the vehicle body is restricted, so that the airbag 222 does not easily move away in the forward direction of the vehicle body. Therefore, a sufficient resistance for restraining the rider R is generated. In particular, since the webbing 230 has a substantially triangular portion formed at a portion where the webbing 230 is mounted to the airbag 222 by the first portion 231 to the third portion 233 of the webbing 230, and the one end 230a of the webbing 230 is secured to the webbing 230 itself, it is possible to, for example, stably hold the airbag 222 by the webbing 230, and to increase the strength with which the webbing 230 is mounted to the airbag 222. In addition, by disposing the webbing 230 between the left and right legs of the rider R sitting astride the seat 103, even if the webbing 230 is exposed from the webbing cover 106 during the deployment of the airbag 222, the frequency with which it gets caught by, for example, the rider R or parts disposed at the vehicle-body structural portion 101 is minimized, so that it is possible to smoothly operate the airbag 222.

Figure 11:
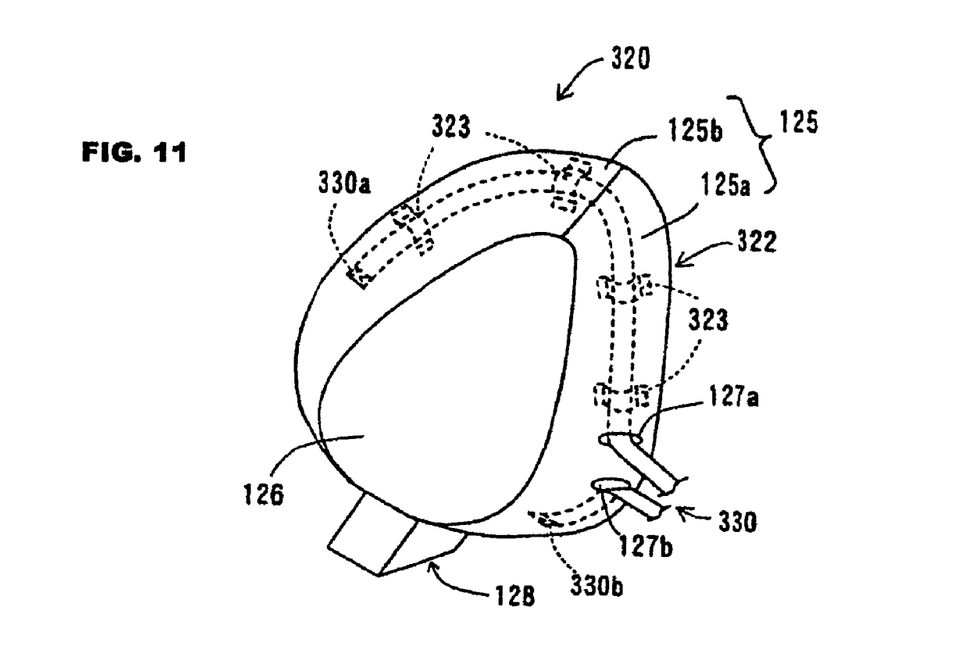
FIG. 11 is a perspective view of an airbag 322 in a third embodiment in a completely deployed and inflated state.
Figure 12:
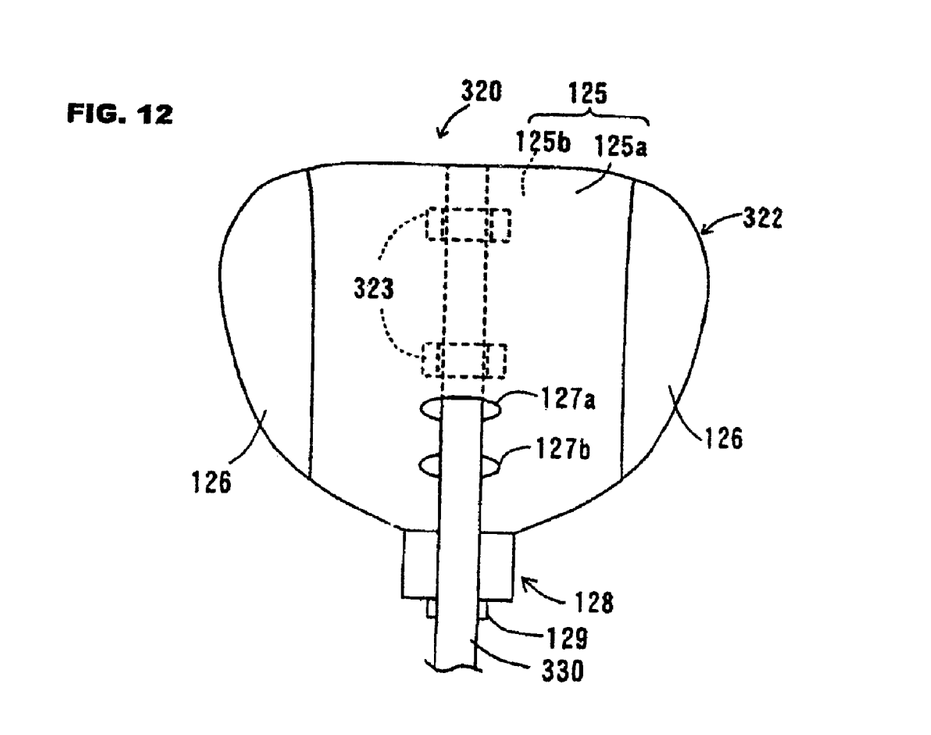
FIG. 12 illustrates the airbag 322 shown in FIG. 11 as seen from the rider R.
Figure 13:
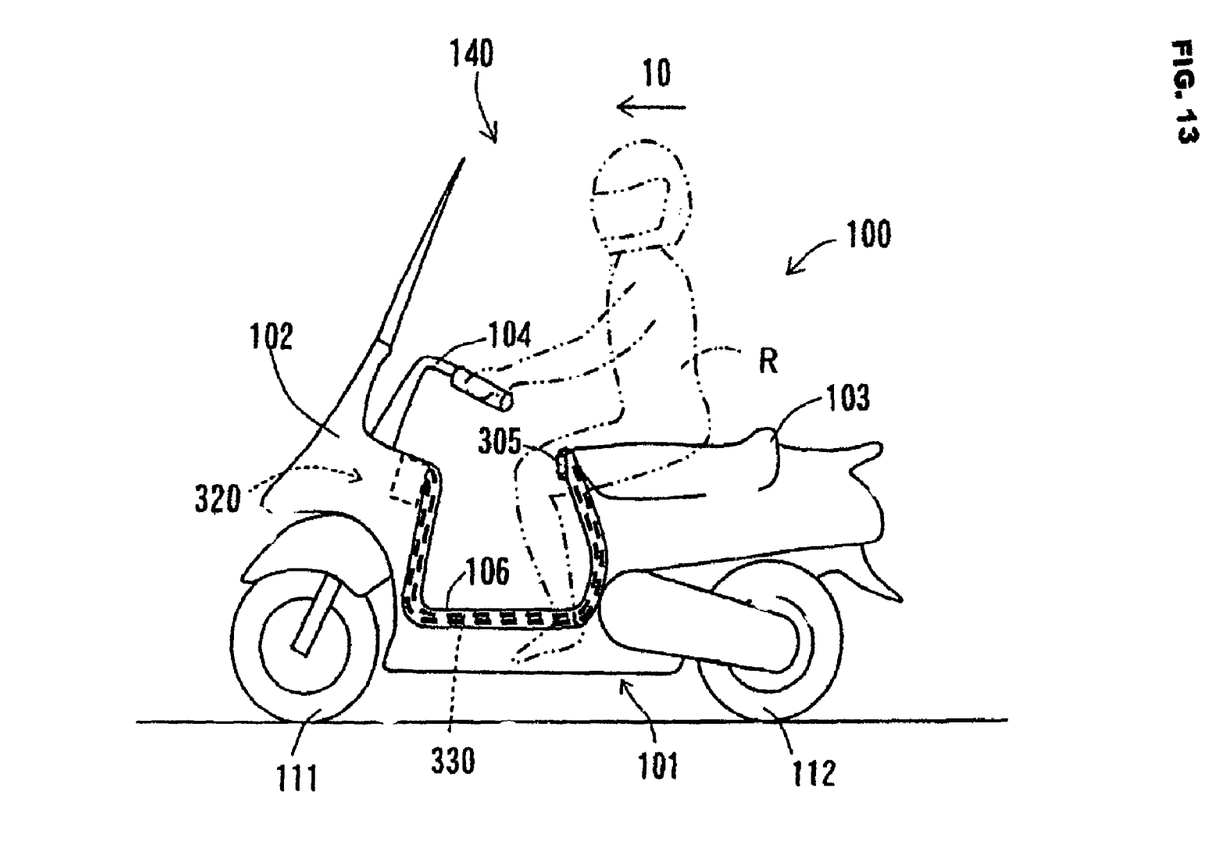
FIG. 13 is a side view of the motor-bicycle 100 having an airbag device 320 mounted thereto.
Figure 14:
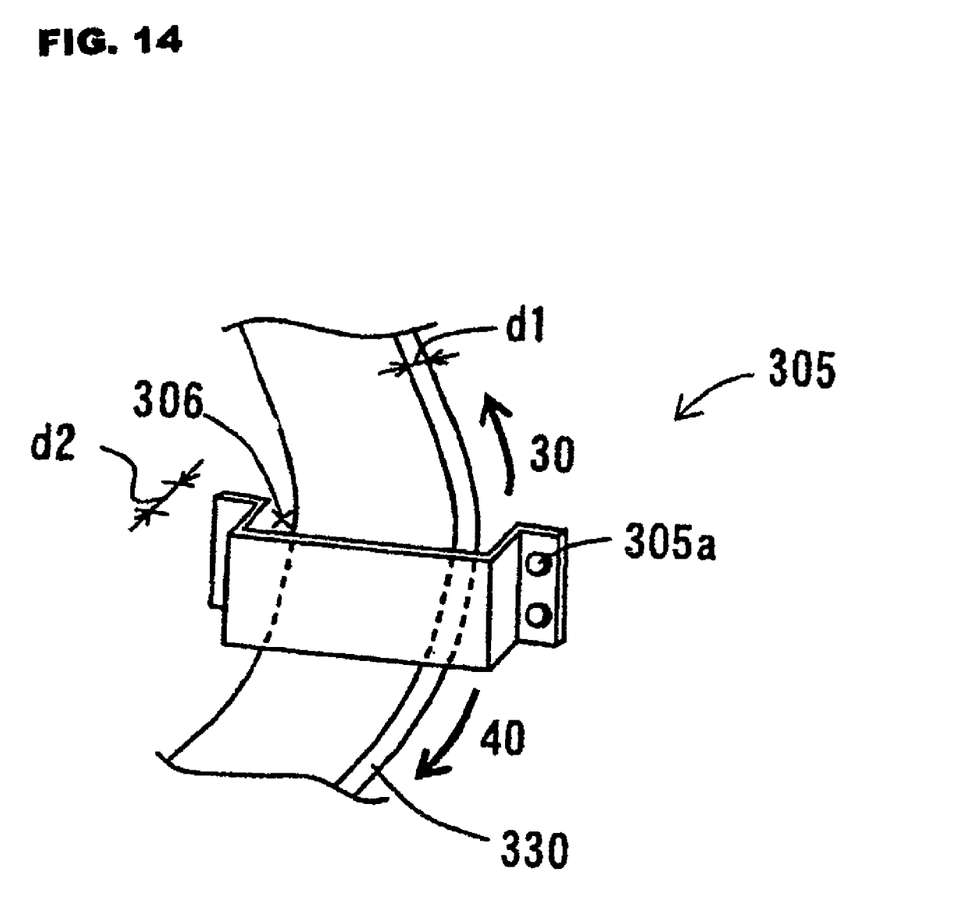
FIG. 14 is a perspective view of a fastener 305 shown in FIG. 13.
Figure 15:
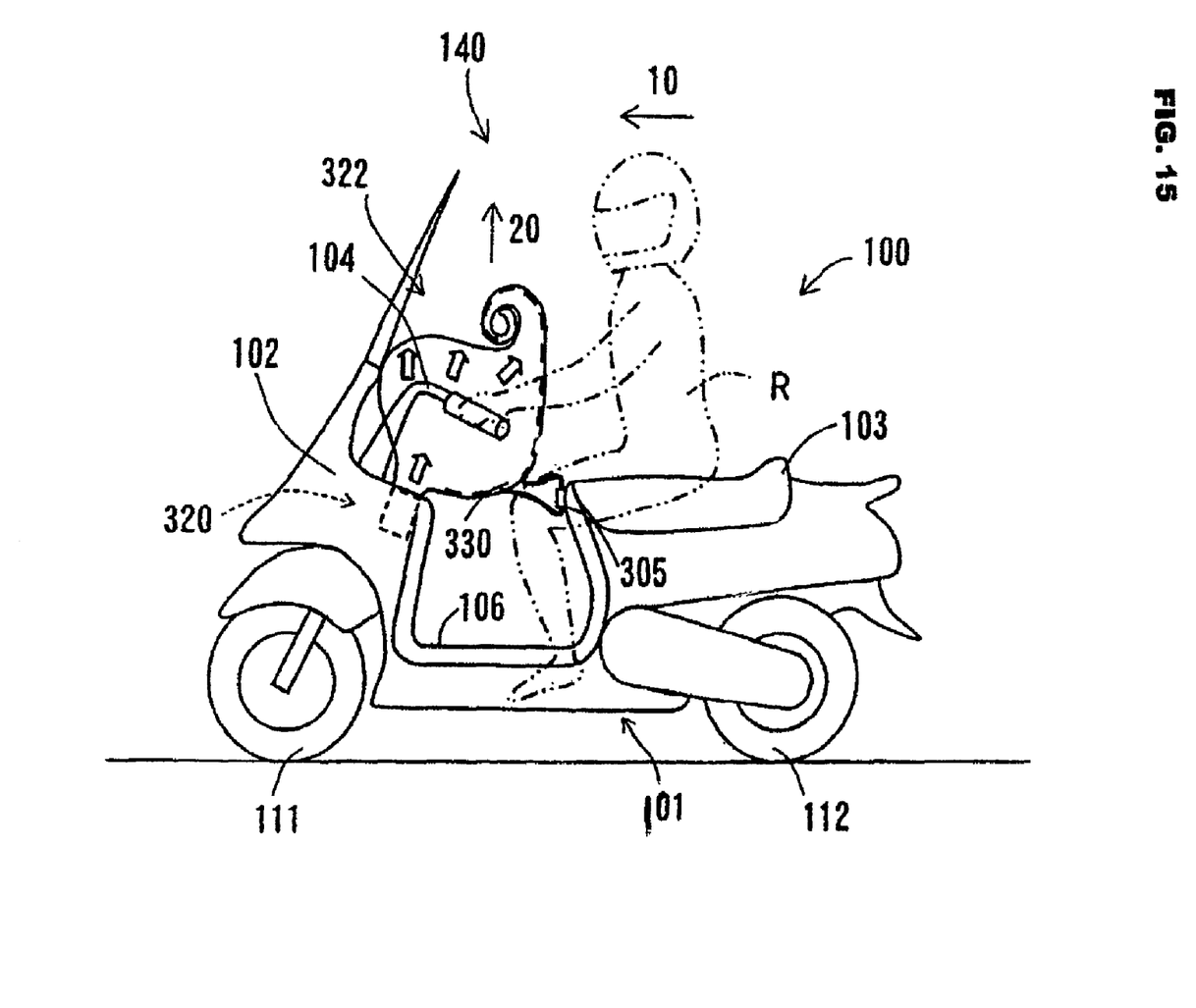
FIG. 15 is a side view of the motor-bicycle 100 during the deployment and inflation of the airbag 322.
Figure 16:
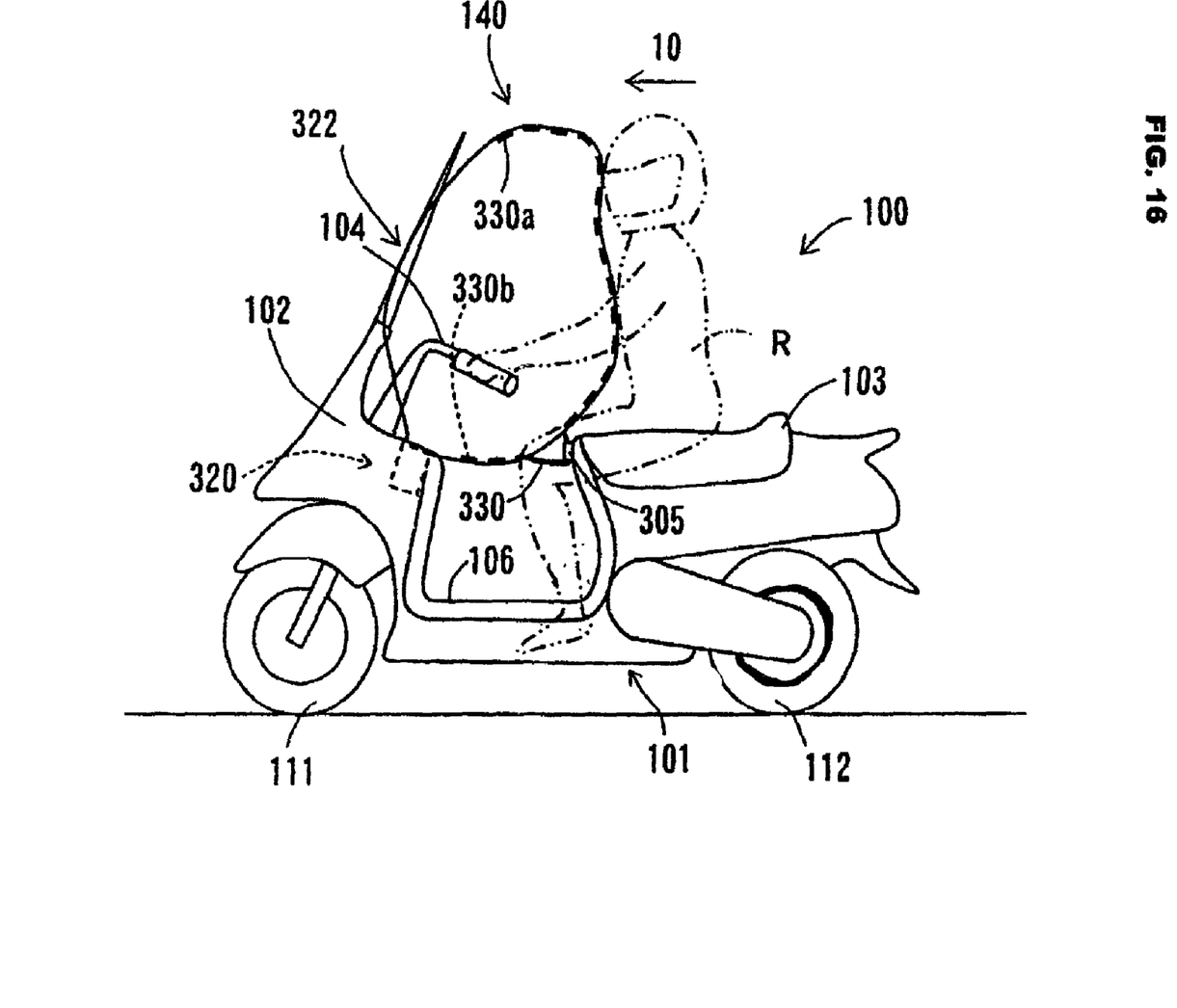
FIG. 16 is a side view of the motor-bicycle 100 when the airbag 322 is completely deployed and inflated.

Next, a third embodiment of the present invention will be described with reference to FIGS. 11 to 16. FIG. 11 is a perspective view of an airbag 322 in the third embodiment in a completely deployed and inflated state. FIG. 12 illustrates the airbag 322 shown in FIG. 11 as seen from the rider R. FIG. 13 is a side view of the motor-bicycle 100 having an airbag device 320 mounted thereto. FIG. 14 is a perspective view of a fastener 305 shown in FIG. 13. FIG. 15 is a side view of the motor-bicycle 100 during the deployment and inflation of the airbag 322. FIG. 16 is a side view of the motor-bicycle 100 when the airbag 322 is completely deployed and inflated. The third embodiment differs from the other embodiments in the mode of mounting a webbing to the airbag 322. Parts having substantially the same structures as parts in the first embodiment are given the same reference numerals, and will not be described below as a matter of convenience.

The airbag device 320 of the third embodiment comprises the airbag 322 taking the form shown in FIGS. 11 and 12 in a completely deployed and inflated state.

The airbag 322 has vent holes 127a and 127b. A plurality of guide portions 323, which are like what are called belt loops, for inserting a webbing 330 are formed in the inner peripheral surface of the airbag 322. One end 330a of the webbing 330 is inserted into the airbag 322 through the vent hole 127a, and the other end 330b of the webbing 330 is inserted into the airbag 322 through the vent hole 127b. These ends 330a and 330b are inserted into their respective guide portions 323, and are mounted to the airbag 322 by, for example, sewing or using an adhesive. In other words, in the embodiment, the webbing 330 is mounted to two locations in the airbag 322. The webbing 330 is formed of, for example, the same material as that of the webbing 130 in the first embodiment.

As shown in FIG. 13, the webbing 330 is connected to the vehicle-body structural portion 101 through the fastener 305. As shown in FIG. 14, the fastener 305 is fastened to the vehicle-body structural portion 101 by a fastening member 305a, such as a bolt, and an insertion portion 306 having a height d2 that is greater than a thickness d1 of the webbing 330 is formed in the fastener 305. By this, the fastener 305 can freely receive the webbing 330 through the insertion portion 306 (that is, allows movement of the webbing 330 in the direction of arrow 30 and in the direction of arrow 40 in FIG. 14).

Returning to FIG. 13, the webbing 330 is disposed between the left and right legs of the rider R sitting astride the seat 103, at a location between the airbag device 320 and the fastener 305, and is covered by the webbing cover 106. In the embodiment, one webbing 330 with an annular shape is used. When the webbing 330 is disposed, two webbings extend parallel to each other. In this state, like the webbing 130 in the first embodiment, the webbing 330 is formed with a length that allows (does not restrict) movement of the airbag 322 in the protruding direction (that is in the direction of arrow 20 in FIG. 6) during the deployment and inflation of the airbag 322. When the webbing 330 is disposed in this manner, it is possible for the webbing 330 to be formed shorter compared to the case in which, for example, the webbing 330 is disposed along the outer wall surface of the airbag 322, so that this structure is an improved structure.

Next, the operation of the airbag device 320 of the third embodiment will be described with reference to, for example, FIGS. 15 and 16.

When the motor-bicycle 100 that the rider R is riding collides in the direction of travel in an accident, as in the first embodiment, this collision of the motor-bicycle 100 at a location that is situated in front of the motor-bicycle 100 is detected in order to start the protrusion (deployment) of the airbag 322 from the airbag device 320 (see FIG. 13) towards the rider protection area 140. Subsequent to this, the airbag 322 continues to be deployed and inflated. At this time, since the webbing 330 is formed with a sufficient length to minimize interference of the webbing 330 with the operation of the airbag 322, the webbing 330 allows (does not restrict) the movement of the airbag 322 in the protruding direction (that is, in the direction of arrow 20 in FIG. 6) during the deployment and inflation of the airbag 322 shown in FIG. 15. Such a structure makes it possible to smoothly operate the airbag 322 that is being deployed and inflated. Here, as the airbag 322 is deployed and inflated, the webbing 330 moves freely in the insertion portion 306 of the fastener 305, so that interference of the webbing 330 with the movement of the airbag 322 in the protruding direction is minimized.

As shown in FIG. 16, when the airbag 322 is completely deployed and inflated, the one end 330a and the other end 330b of the webbing 330 are stretched between the airbag 322 and the fastener 305. The tension of the webbing 130 restricts the movement of the airbag 322 in the forward direction of the vehicle body. Therefore, the airbag 322 does not easily move away in the forward direction of the vehicle body, so that a sufficient resistance for restraining the rider R is generated. In particular, in the embodiment, since the webbing 330 is mounted to two locations (which are vertically above and below each other) of the airbag 322, it is possible to resist a large load when restraining the rider. According to such a structure, it is possible to restrict vertical movement of the airbag 322 by a portion of the webbing 330 below the airbag 322, so that the airbag 322 can be deployed and inflated at a suitable position.

By disposing the webbing 330 between the left and right legs of the rider R sitting astride the seat 103, even if the webbing 330 is exposed from the webbing cover 106 during the deployment of the airbag 322, the frequency with which it gets caught by, for example, the rider R or parts disposed at the vehicle-body structural portion is minimized, so that it is possible to smoothly operate the airbag 322.

The present invention is not limited to the above-described embodiments, so that various other applications and modifications are possible. For example, the following forms to which the first to third embodiments are applied are possible.

Although the airbag devices of the first to third embodiments are formed with a structure which, by forming the webbing (securing member) with a suitable length, allows movement of the airbag in the protruding direction during the deployment and inflation of the airbag, such a structure may be realized by other means.

For example, such a structure may be realized by using, for example, retracting means for retracting the securing member. Here, during the deployment and inflation of the airbag, the securing member is drawn out while the retracting means restricts the force exerted upon the securing member. In addition, when the deployment and inflation of the airbag are completed, the securing member is maximally drawn out from the retracting means in order to restrict the movement of the airbag in the forward direction of the vehicle body.

Although, in the first to third embodiments, the case in which the webbing is disposed along an area extending between the left and right legs of the rider sitting astride the seat is described, the disposition of the webbing may be variously changed as required as long as the structure allows the movement of the airbag in the protruding direction during the deployment and inflation of the airbag.

The number of webbings (securing members) and the number of webbings (securing members) disposed between the airbag and the vehicle-body structural portion are not limited, so that any number of them may be used as required.

Although, in the first to third embodiments, a vent hole connecting the inside and outside of the airbag is used as a through hole for passing the webbing, a through hole connecting the inside and outside of the airbag that is different from this vent hole may be formed. In this case, a proper number of through holes may be used in accordance with, for example, the number of webbings.

Although the first to third embodiments are described with reference to the motor-bicycle 100 (scooter), the present invention may be applied to other types of motorcycles.

According to the present invention, a technology of constructing an airbag which thoroughly protects a rider in an accident, and technologies related thereto are provided.

What is claimed is:

1. A motorcycle including an airbag device, the motorcycle comprising:
   a body of the motorcycle having a centerline extending in a fore-and-aft direction along the body;
   a seat for a rider;
   handlebars forwardly of the seat for steering of the motorcycle;
   a floor portion of the motorcycle body that is lowered relative to the seat and extends between the seat and the handlebars to provide an open gap therebetween;
   an airbag for being deployed and inflated in emergency conditions;
   a retainer from which the airbag is deployed and being mounted to the body adjacent the handlebars, higher than the floor portion, and forwardly spaced from the seat along the body so that the retainer is closer to the handlebars than the seat;
   an elongate securing member for the airbag extending on the centerline of the motorcycle body;
   a fastener for the securing member being mounted to the body adjacent the seat; and
   opposite end portions of the elongate securing member with one of the end portions secured to the airbag and the other end portion secured to the fastener such that with the spacing between the retainer and the fastener there is a long intermediate portion of the elongate securing member extending on the centerline of the motorcycle body from the fastener, down to the floor portion and forwardly therealong, and up to the retainer prior to airbag deployment.

2. The motorcycle of claim 1 wherein the airbag includes an interior, and the one end portion extends in the interior of the airbag.

3. The motorcycle of claim 1 wherein the airbag has central and side portions, and the one end portion of the elongate securing member is secured to the central portion of the airbag.

* * * * *